Feb. 3, 1925.

W. P. BOVARD

ARC WELDING DEVICE

Filed July 19, 1923

1,524,907

Witness:

G. G. Allenbaugh

WILLIAM P. BOVARD.
Inventor

By

Attorney

Patented Feb. 3, 1925.

1,524,907

UNITED STATES PATENT OFFICE.

WILLIAM P. BOVARD, OF MANSFIELD, OHIO, ASSIGNOR TO THE OHIO BRASS COMPANY, OF MANSFIELD, OHIO, A CORPORATION OF NEW JERSEY.

ARC-WELDING DEVICE.

Application filed July 19, 1923. Serial No. 652,506.

*To all whom it may concern:*

Be it known that I, WILLIAM P. BOVARD, a citizen of the United States of America, residing at Mansfield, in the county of Richland and State of Ohio, have invented certain new and useful Improvements in an Arc-Welding Device, of which the following is a specification.

My invention relates to rail bonding and has particular reference to that class of devices known as bond clamps and has particular application to bonds applied by the electric arc.

One object of my invention is to provide means for placing the rail bonds in position upon the rail before and during the welding operation, and another object of my invention is to provide means for initially striking the arc used in the welding operation where the arc is applied through the medium of a metal electrode.

It has been found that where a metallic electrode is used in connection with electric welding and where this electrode is of copper or a copper base metal, that the electrode is liable to stick or freeze to the part to be welded when it is brought in contact with the same, and when this occurs the operator is obliged to move the electrode until the union is ruptured before the electrode can be withdrawn. This is a source of considerable annoyance and waste of time to the operator.

My invention overcomes this difficulty by providing means whereby the arc can be initially struck between the electrode and the conducting material to which the electrode will not adhere, and after the arc has been formed the electrode and arc can be moved over into proper position where welding is to take place.

My invention resides in the new and novel combination, relation and construction of the parts hereinafter fully described and disclosed in the accompanying.

In the accompanying drawing:—

Figure 1:
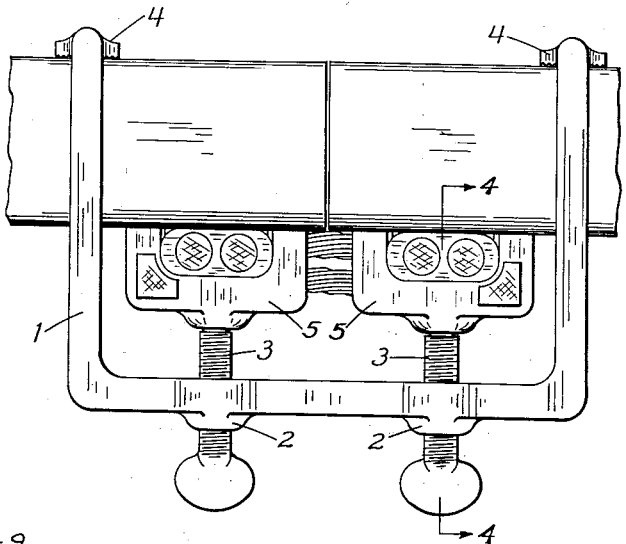
Fig. 1 is a top plan view of two adjacent rail ends with a bond held in position by my invention.
Figure 2:
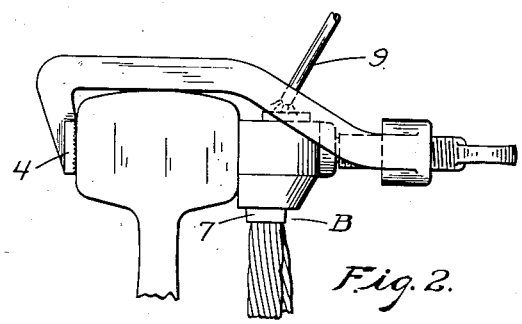
Fig. 2 is an end view of Fig. 1, but shows in addition the metal electrode used in welding.
Figure 3:
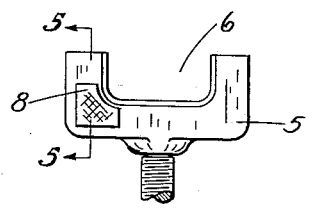
Fig. 3 is a top plan view of one of the holding members of my invention with a portion of the operating and adjusting screw projecting therefrom.
Figure 4:
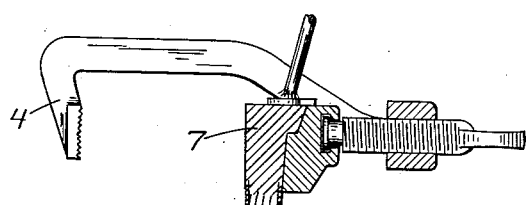
Fig. 4 is a sectional view of my invention on the line 4—4 of Fig. 1 and shows in addition the electrode in position for striking the initial arc.
Figure 5:
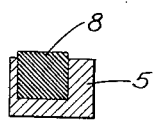
Fig. 5 is a sectional view of Fig. 3 on the line 5—5 and shows the member to which the electrode is contacted in striking the initial arc.

In the preferred form of device embodying my invention I employ a frame 1 provided with two bosses 2 threaded to receive the adjusting screws 3. The frame 1 is also provided with over-hanging members 4 to engage the face of the rail opposite that to which the rail bond B is applied. Secured to each adjusting screw 3 is a holding member 5 so secured and related to the screw 3 that each set of members 3 and 5 are adjustable relative to each other about the axis of the screw 3, and each set of members 3 and 5 are movably independent of each other. This latter point is of decided value in cases where the adjacent ends of the rail are not in perfect alinement as in the case of rails which have been in service for some time.

The holding member 5 is provided with a transverse slot 6 shaped to conform to the terminal 7 of the rail bond B so that when the bond is held in position by my improved holding device the terminal is substantially immovable relative to the rail. I have shown one method of securing the members 3 and 5 together, which is obvious, so as to permit pivotal movement of these parts relative to each other, but other well known methods may be employed.

Inserted in the holding member 5 and adjacent to the transverse slot 6 is a carbon or graphite insert 8. The insert 8, being of carbon or graphite, will not fuse and unite with the fused end of the metal electrode 9 and, therefore, when an arc is struck by contacting the electrode 9 with the insert 8 there is no sticking or freezing of the electrode and the insert and the electrode 9 can then be moved over into position with respect to the terminal 7 of the rail bond and the established arc will fall.

In using my invention the rail bond B is held in position against the rail surface by the operator's hand, the holding device is then placed in position and the holding members 5 brought into engagement with its corresponding bond terminal by means of the adjusting screws 3, which is operated until the members 4 are brought into firm engagement with the face of the rail. After this operation has been carried out with respect to both holding members 5, the bond and device are in position for the operator to begin the welding operation.

The electrical connections used are those commonly known in the welding art in which the rail bond and clamping device form one electrode of a welding circuit and the metal electrode 9 forms the other. As the members 5 and 8 are both of conducting material, the member 8 is, of course, of the same polarity as the rail and bond. The operator applies the metal electrode 9 to the carbon or graphite member 8 and then withdraws the electrode sufficiently to form an arc between the electrode 9 and the member 8. The operator then moves the electrode over into position with respect to the bond terminal 7, the arc following along and proceeds with the welding. If the arc should break during the welding operation the operator would again strike an arc between the electrode 9 and the member 8 and then move the electrode over into welding position.

It is quite evident that the holding member may be entirely or practically entirely made of graphite or carbon or other refractory conducting material.

There are, of course, many modifications which may be made to the specific disclosure given above which would fall within the scope of my invention.

My invention is applicable not only to the positioning of rail bonds, but in connection with the arc welding art in general where a metallic electrode is used.

I claim:

1. A holding device comprising a frame, means on the frame to engage a rail, holding means secured to the frame to engage and hold a rail bond terminal and refractory conducting means on the holding means and electrically connected to the rail.

2. A holding device comprising a frame to engage a rail, holding means on the frame to engage and hold a rail bond terminal, means secured to the holding means to move the holding means into and out of engagement with the terminal and refractory conducting means on the holding means and electrically connected to the rail.

3. A holding device comprising a frame, holding means to engage and hold a rail bond terminal, means electrically connecting the holding means and the frame and operating to move the holding means into and out of engagement with the bond terminal and refractory conducting means mounted on the holding means and electrically connected thereto.

4. A holding device provided with means for holding a refractory conducting material adjacent to but not in physical engagement with an article to be welded by the electric arc process.

5. A holding device provided with means for holding a refractory conducting material adjacent to but not in physical engagement with an article to be welded by the electric arc process, said refractory means having electrical connection with said article.

6. A holding device provided with means for holding a bond terminal in position and for holding a refractory conducting member adjacent the terminal, means to move the holding means and refractory member towards and away from the bond terminal and means for holding the said holding means in fixed relation to the bond terminal.

7. A holding device comprising a plurality of independently operating holding means to engage and hold a bond terminal in position, means to move each holding means independently of the other into or out of engagement with the bond terminal and refractory conducting means mounted on each holding means for the purpose described.

8. A holding device comprising a plurality of independently operating metallic holding means to engage and hold a rail bond terminal in position, refractory conducting means mounted on each holding means to be engaged by an electrode and means to move each holding means independently of the other into or out of engagement with the bond terminal.

9. A holding device provided with metallic means for holding a bond terminal in position and a refractory conducting member mounted on the said metallic means and means to move the holding means at will into or out of engagement with the bond terminal.

10. A holding device provided with a metallic holding means to engage and hold a bond terminal in position, refractory conducting means mounted on the holding means and means rotatably secured to the holding means to maintain the holding means in engagement with the bond terminal.

11. An article of manufacture comprising a refractory electrical conducting member, rotatable means secured to the refractory member for holding the member adjacent to, but not in engagement with an article to be welded and means to connect the member to a source of electric power.

In testimony whereof I affix my signature.

WILLIAM P. BOVARD.